April 2, 1929.  B. F. BAILEY  1,707,424
INDUCTION MOTOR
Filed Feb. 18, 1927  2 Sheets-Sheet 1
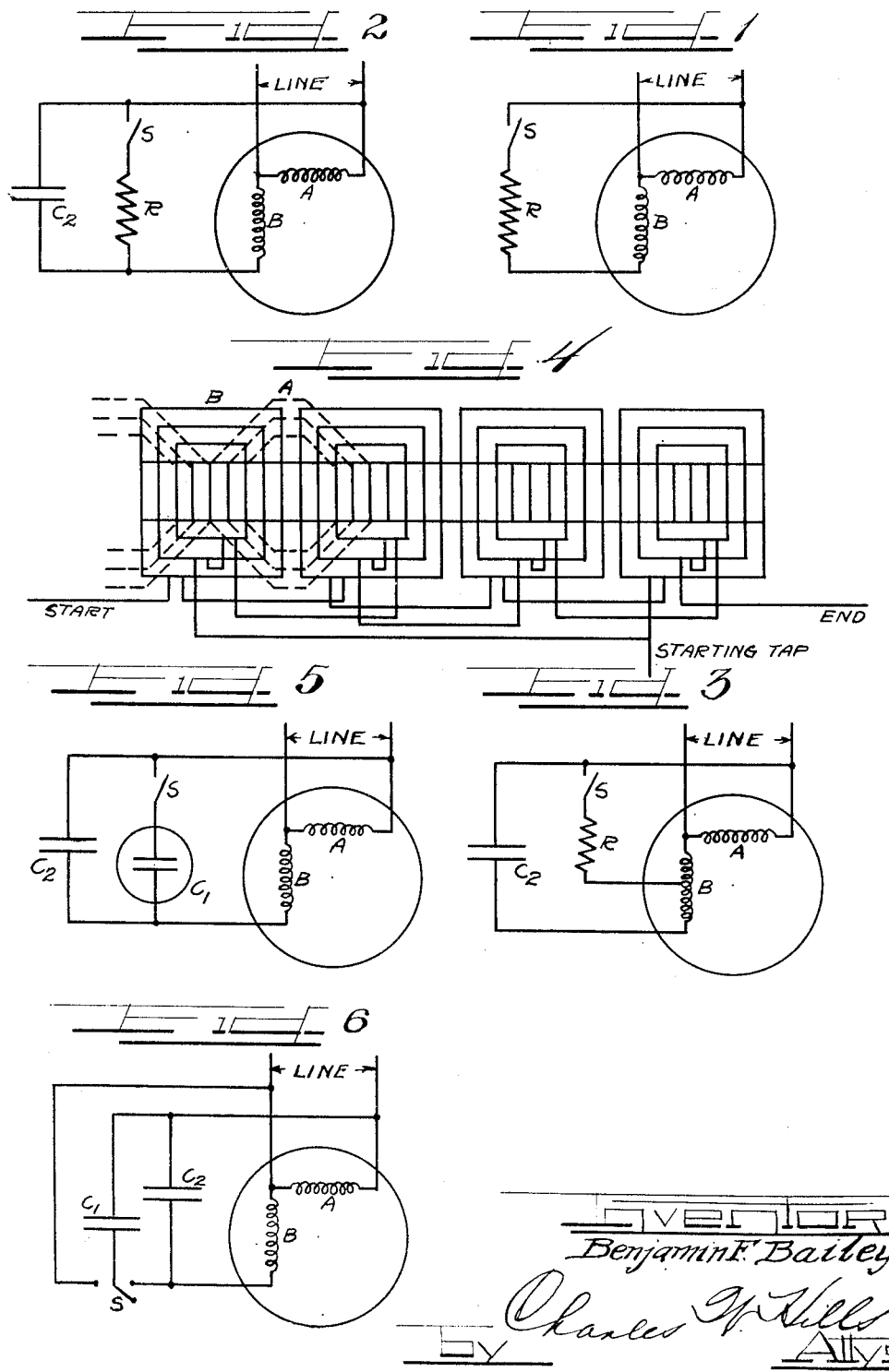

April 2, 1929.  B. F. BAILEY  1,707,424
INDUCTION MOTOR
Filed Feb. 18, 1927  2 Sheets-Sheet 2
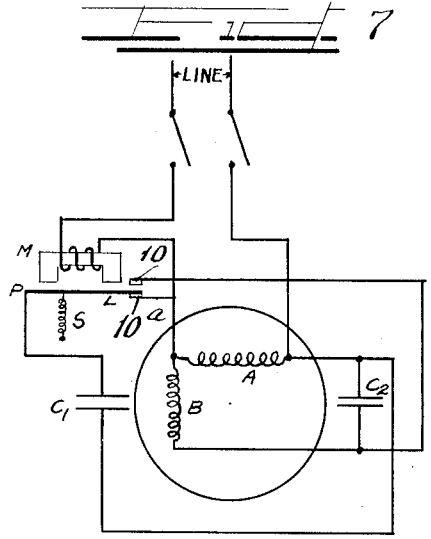
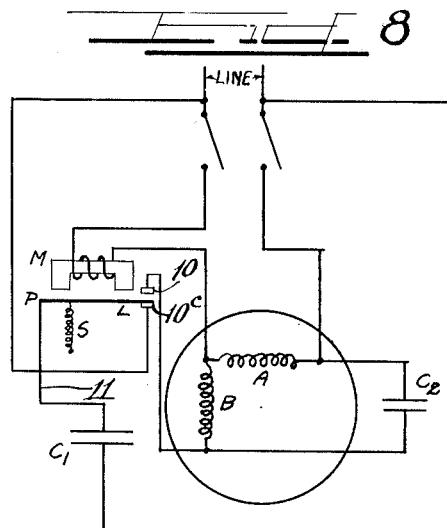
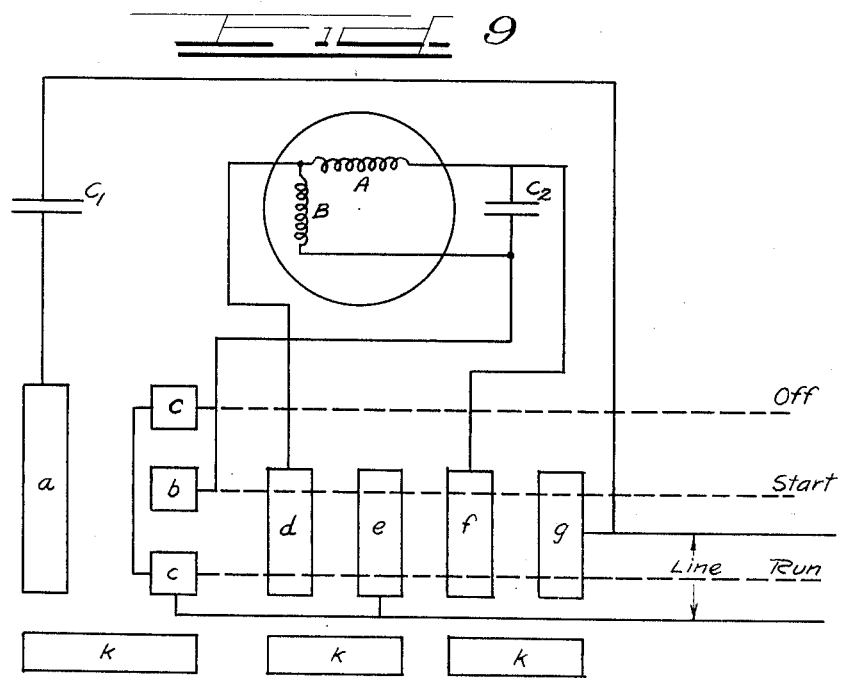
INVENTOR
Benjamin F. Bailey
BY Charles H. Hill
ATTYS Patented Apr. 2, 1929.

1,707,424

UNITED STATES PATENT OFFICE.

BENJAMIN F. BAILEY, OF ANN ARBOR, MICHIGAN, ASSIGNOR TO REGENTS OF THE UNIVERSITY OF MICHIGAN, A CORPORATION OF MICHIGAN.

INDUCTION MOTOR.

Application filed February 18, 1927. Serial No. 169,165.

This invention relates to an induction motor and particularly to an induction motor which may be economically constructed and which at the same time has good running and satisfactory starting characteristics.

In my copending application for patent for an "electric motor", filed July 13th, 1925, Serial No. 43,100, of which this is a continuation in part I have disclosed a motor having two windings, approximately 90° different in phase. It is an object of the present invention to provide a motor of this type which embodies certain improvements upon the motor disclosed in my aforesaid copending application and which at the same time may be economically constructed.

A further important object of this invention is to provide an induction motor having a plurality of windings with a plurality of condensers connected in parallel across said windings, certain of said condensers being disconnectable.

Another important object of the present invention comprises the provision of a motor having condensers connected in the manner described, certain of which are electrolytic condensers, or condensers of a type adapted preferably for intermittent use, whereby sufficient capacity for proper starting torque may be provided at a cost commensurate with commercial adoption.

Other and further important objects of this invention will be apparent from the disclosures in the specification and the accompanying drawings.

The invention (in a preferred form) is illustrated in the drawings and hereinafter more fully described.

On the drawings:

Figure 1 is a diagrammatic view illustrating a type of motor adapted to be provided with the improved equipment of this invention.

Figure 2 is a similar view showing one form of connection embodying the present invention.

Figure 3 is a similar view showing another form of connection.

Figure 4 is a diagrammatic view illustrating a method of winding a motor embodying the present invention.

Figure 5 is a view similar to Figure 3 showing another arrangement embodying the present invention.

Figure 6 is a view similar to Figure 5 showing another arrangement.

Figure 7 is a diagrammatic view showing a method of applying the apparatus of this invention to an ordinary motor installation.

Figure 8 is a view similar to Figure 7 showing a modification wherein one of the condensers is always connected across the line except when the motor is being started.

Figure 9 is a diagrammatic view showing connections for a manually operated starting switch in connection with an installation embodying the present invention.

As shown on the drawings:

In Figure 1 I have illustrated the connections of the ordinary split phase induction motor. The difference in phase between the current in the winding A and that in the winding B is secured by inserting a resistor R in series with the winding B. The current lags less in circuit B than in circuit A and the motor therefore develops a starting torque. The switch S is opened automatically or otherwise when the motor approaches normal speed.

In Figure 2 I have shown an arrangement in which a resistor R and a condenser $C_2$ are connected as shown for purposes which will be evident hereinafter.

I find that in practice, it is frequently desirable to have more turns in the winding B than in the winding A. This arises from the fact that with more turns in the winding B the condenser $C_2$ can have a much smaller capacity. If, however, the winding B has many turns compared with the winding A, it is impossible to secure sufficient starting torque with the connection shown in Figures 1 or 2.

To obviate this difficulty, I have devised the arrangement shown in Figure 3. With this connection, the large starting current passing through the resistor R goes through only a portion of the turns of the winding B. In normal operation, the switch S is open and the motor of Figure 3 has the same characteristics as the motor shown in Figure 1 or Figure 2.

For the best operation under most circumstances, it is desirable that not only should the winding B as a whole be at 90 electrical degrees from the winding A but the portion of the winding B through which the starting current flows should also be at 90 electrical degrees from the winding A.

One method of securing this result is shown in Figure 4. In this figure, I have illustrated the winding of a 4-pole motor having 36 slots. The winding A is indicated by dotted lines and the winding B by full lines. The connection of the winding A is the same as that in any ordinary motor and is not shown. Normally the three coils of each of the four groups would be connected in series thus forming four groups. These four groups would then be connected in series in such a way that the currents around adjacent groups would be in opposite directions. This is merely one of the well known ways of connecting a single phase motor.

The winding B in my invention would, however, be connected as illustrated so that the current would pass around the four largest coils of the B winding in the proper direction and a starting tap would be brought out after the current had passed through these four largest coils. The winding would then continue so that the current would pass through the smaller coils in the usual way. With this connection, the B winding as a whole would be at right angles electrically to the A winding and this would also be true of the portion used in starting.

I do not wish to confine myself to the precise connection described above as it might prove desirable to pass first through all the middle sized coils or even through all the smallest coils. Other obvious modifications will readily occur to those skilled in the art pertaining to such windings.

In some machines having a winding in which as many coils as slots are used, the coils are all of the same dimensions and are placed at an angle so that they overlap one another. As an illustration of the way in which I would use such a winding I will assume a four pole motor having 24 slots and 24 coils. Numbering the coils consecutively around the machine (the numbers being arbitrarily chosen and not being reference numerals on the drawings), coils 1, 2, 3; 7, 8, 9; 13, 14, 15; 19, 20 and 21 would be connected in one winding. The coils 1, 2 and 3 constitute a polar group. They would be connected in series in such a way that the direction of the current would be the same in all of them. Similarly 7, 8, 9 would form a polar group as would 13, 14, 15 and 19, 20, 21. The four groups would be connected in series, the connection being such that the current would pass in opposite directions in adjacent groups.

The remaining twelve coils might be connected in the following order: 5, 11, 17, 23, 4, 6, 10, 12, 16, 18, 22, 24. The connections should be such that the current in coils 4, 5, 6, 16, 17 and 18 would be in the opposite direction from that in coils 10, 11, 12, 22, 23, 24. A tap would be brought out between coils 17 and 23 and the coils 5, 11, 17 and 23 used in starting. It will be apparent to those familiar with armature windings that the coils 5, 11, 17 and 23 will constitute a winding at 90 electrical degrees from the first or "main" winding.

I can also accomplish my object in the following way: The main winding would be connected in any of the well known ways, for connecting single phase windings. The starting winding would be arranged to be at an angle of 90 electrical degrees from the main winding. In the starting winding, each of the usual coils would be replaced by two coils. They would usually be wound with the same size of wire but with different numbers of turns. Each of the sets of starting coils would be connected in the usual manner and the two sets connected in series. A tap would be brought out from the junction point of the two sets of coils. During the starting period, the current would be led through one set of coils but both would be used during normal running, the external connections being as shown in Figure 3. By adopting this method, the distribution of current in the starting winding would be the same during starting as during the running period. This is highly desirable in order that I may obtain the greatest possible starting torque for a given current.

In Figure 5 I have illustrated another modification of my motor. The connections are identical with those of Figure 2 but the resistance R has been replaced by an electrolytic condenser $C_1$.

As is well known, an electrolytic condenser consists of two metallic plates immersed in a liquid. The plates are usually of aluminum although other metals have been used and the solution is frequently a solution of borax or ammonium phosphate although many other solutions may be used. It is well known that an aluminum plate in such a solution acts as an electric valve allowing current to pass freely from the solution to the plate but interposing a high resistance to the passage of current from the plate to the solution. If alternating voltage is applied to such a cell it acts as a condenser of large capacity since the insulating film which forms on the aluminum plate is extremely thin.

Such condensers are not much used in ordinary practice since there is a considerable loss of energy in the condenser and since the cell is likely to overheat and fail to function properly if used continuously. When used as shown in Figure 5 to assist in starting a motor these defects are of small importance since the electrolytic condenser is used only for a short time. Since such a condenser is much cheaper than one of the ordinary construction, its use in this way becomes very advantageous.

As these electrolytic condensers are not adapted to withstand very high voltage, it may in practice be necessary to use two or more such condensers in series.

Another modification of my invention is shown in Figure 6. At the moment of starting, the switch S is thrown to the right so that the two condensers $C_1$ and $C_2$ are connected in parallel. When the motor has attained approximately full speed, the switch S would be thrown to the left. The condenser $C_1$ would then be connected directly across the line and would have no effect whatever upon the motor except that its presence would tend to improve the regulation and therefore maintain the voltage constant. The condenser $C_2$ would remain as previously described in series with the winding B and would therefore cause the motor to operate at or near unity power factor.

The above method of operation offers great advantages. The condensers $C_1$, since it is necessarily of considerable capacity, is costly and if used as indicated in previous connections would be in service only while the motor is being started. If a connection similar to Figure 7 is used, it can however be of use all the time except when the motor is being started. To obtain this result, the connections of $C_1$ would be made ahead of the main switch of the motor. If it is thought desirable, $C_1$ can, however, be connected back of the main switch in which case it will be connected to the line whenever the motor is running with the exception of the short starting period.

Operation in this manner is highly desirable since in most installations the current lags behind the voltage. The introduction of a condenser which takes a leading current will therefore tend to improve the power factor on the entire system. The cost of this condenser can therefore readily be justified.

In Figures 7, 8 and 9, I have shown three ways in which this idea can be applied in practice. In Figure 7, an automatic switch is used to change the connections of the condenser $C_1$. When the main line switch is closed a heavy current flows through the winding A of the motor and through the coil of a magnet M. This in turn attracts a lever L which is made of magnetic material, against the pull of the spring S. This causes said lever L to make contact with the upper contact 10 of two contacts 10 and 10ª and connects the condenser $C_1$ in parallel with $C_2$. As soon as the motor attains normal speed, the current in winding A decreases enough so that the spring S overcomes the pull of the magnet and causes the lever L to make contact with the lower contact 10ª. The condenser $C_1$ is then connected directly across the line. When the main line switch is open, both contacts are disconnected so that the condenser $C_1$ is in service only when the motor is running.

Figure 8 is a modification of Figure 7 in which the connections are such that the condenser $C_1$ is always connected across the line except when the motor is being started, being connected to the contact 10ª during normal operation through a conductor 11.

In Figure 9, I have shown connections for a manually operated starting switch. The three conducting blocks marked K are arranged so that they occupy successively the positions marked "Off", "Start" and "Run" In the position marked "Start", A is connected to B and C, D is connected to E and F to G. The condenser $C_1$ is then in parallel with condenser $C_2$ and the other connections are such that the motor starts as usual. In the position marked "Run", A is connected to C, D to E and F to G. The condenser $C_1$ is then connected across the line. The main line current is led to the motor through contacts D and F.

This starting switch could readily be modified so that the condenser $C_1$ would be used to assist in starting and would be connected across the line whenever the motor was running. To do this, it would only be necessary to remove the upper one of the two contacts marked C.

It will thus be apparent that I have provided an induction motor which may be simply and economically constructed and wherein the auxiliary apparatus may be kept at a minimum of size and constructed inexpensively. A motor constructed and equipped in accordance with the present invention, for reasons previously noted herein, should have sufficiently good starting characteristics and such superior running characteristics as to make it very desirable for use in many classes of work.

I am aware that numerous details of construction may be varied through a wide range without departing from the principles of this invention, and I therefore do not purpose limiting the patent granted, otherwise than necessitated by the prior art.

I claim as my invention:

1. In an induction motor, a power line, two windings, two condensers in parallel connected in series with one of said windings and to the power line, and a switch for disconnecting one of the said condensers.

2. In an induction motor, two primary windings, a power line, condensers connected in series with one of the said windings, and means for disconnecting one of said condensers and connecting the same across the line.

3. In an induction motor, two primary windings, a power line, condensers connected in series with one of the said windings, and means for automatically disconnecting one of said condensers and connecting the same across the power line when the motor has attained normal running speed.

4. In an induction motor, two primary windings, a power line, condensers connected in series with one of said windings, and magnetically controlled means for automatically disconnecting one of said condensers and connecting the same across the power line when the motor has attained normal running speed.

5. In an induction motor, two windings, one of which is connected to a source of current, a condenser connected in series with the other winding, an electrolytic condenser connected in parallel with said first condenser, and a switch for disconnecting said electrolytic condenser.

6. The combination with an induction motor having a plurality of stator windings and a power line for supplying energy thereto, of a condenser connected in series with one of the stator windings, another condenser connected across the line, and switch means for connecting said second condenser in series with the said stator winding and in parallel with the first mentioned condenser.

7. The combination with an induction motor having a plurality of stator windings and a power line for supplying energy thereto, of a condenser connected in series with one of the stator windings, another condenser connected across the line, an electro-magnetically controlled switch means for connecting said second condenser in series with the said stator winding and in parallel with the first-mentioned condenser.

8. In an induction motor, two windings, a power line, condensers in parallel connected in series with one of said windings and to the power line, and means for automatically disconnecting certain of said condensers after the motor has attained substantially normal running speed.

In testimony whereof I have hereunto subscribed my name at Ann Arbor, Washtenaw County, Michigan.

BENJAMIN F. BAILEY